United States Patent
Zhang et al.

(10) Patent No.: US 11,607,800 B2
(45) Date of Patent: Mar. 21, 2023

(54) CYCLOIDAL TRANSMISSION WITH TORQUE DETECTION MECHANISM

(71) Applicant: PILZ GMBH & CO. KG, Ostfildern (DE)

(72) Inventors: Peng Zhang, Ostfildern (DE); Uwe Schoch, Ostfildern (DE)

(73) Assignee: Pilz GmbH & Co. KG, Ostfildern (DE)

( * ) Notice: Subject to any disclaimer, the term of this patent is extended or adjusted under 35 U.S.C. 154(b) by 87 days.

(21) Appl. No.: 16/932,810

(22) Filed: Jul. 19, 2020

(65) Prior Publication Data

US 2021/0031362 A1 Feb. 4, 2021

(30) Foreign Application Priority Data

Jul. 19, 2019 (DE) ...................... 10 2019 119 658.2

(51) Int. Cl.
| | | |
|---|---|---|
| *B25J 9/10* | (2006.01) | |
| *B25J 13/08* | (2006.01) | |
| *F16H 1/32* | (2006.01) | |
| *B25J 15/00* | (2006.01) | |
| *F16H 57/01* | (2012.01) | |

(52) U.S. Cl.
CPC ............... *B25J 9/102* (2013.01); *B25J 9/108* (2013.01); *B25J 9/109* (2013.01); *B25J 13/085* (2013.01); *F16H 1/32* (2013.01); *B25J 15/00* (2013.01); *F16H 2001/325* (2013.01); *F16H 2057/016* (2013.01)

(58) Field of Classification Search
CPC ... B25J 9/102; B25J 9/108; B25J 9/109; B25J 13/085; F16H 1/32; F16H 2001/325; F16H 2057/016
See application file for complete search history.

(56) References Cited

U.S. PATENT DOCUMENTS

| | | | | |
|---|---|---|---|---|
| 2,475,504 | A | * | 7/1949 | Jackson .................... F16H 1/32 475/179 |
| 4,898,065 | A | | 2/1990 | Ogata et al. |
| 6,269,702 | B1 | | 8/2001 | Lambson |
| 9,561,585 | B2 | | 2/2017 | Tanaka |

(Continued)

FOREIGN PATENT DOCUMENTS

| | | |
|---|---|---|
| DE | 10 2015 214 170 A1 | 2/2017 |
| DE | 10 2018 205 154 A1 | 10/2018 |

(Continued)

*Primary Examiner* — William C Joyce
(74) *Attorney, Agent, or Firm* — Miller Johnson

(57) ABSTRACT

A cycloidal transmission for a drive includes a housing, a drive shaft, an eccentric, a cam plate, a pin plate, an output shaft, and a torque detection mechanism. The housing includes a first bearing, a second bearing, and a rolling ring. The drive shaft is rotatably mounted in the first bearing. The eccentric is fixedly connected to the drive shaft. The cam plate is driven by the eccentric. The cam plate is configured to roll in the rolling ring. Pins of the pin plate are configured to engage holes of the cam plate, so that the pin plate is driven by the cam plate. The output shaft is fixedly connected to the pin plate. The output shaft is rotatably mounted in the second bearing. The torque detection mechanism is between the first bearing and the second bearing and configured to detect the torque of the output shaft.

14 Claims, 3 Drawing Sheets

(56) References Cited

U.S. PATENT DOCUMENTS

2010/0005907 A1    1/2010  Kato et al.
2018/0291995 A1*  10/2018  Hayashibara ............ B25J 9/046
2019/0009417 A1    1/2019  Ogata
2019/0140526 A1    5/2019  Tamura et al.

FOREIGN PATENT DOCUMENTS

EP    2 532 927 B1    3/2014
EP    2 851 675 A1    3/2015

* cited by examiner

CYCLOIDAL TRANSMISSION WITH TORQUE DETECTION MECHANISM

CROSS-REFERENCE TO RELATED APPLICATIONS

This application claims priority to German Application No. 10 2019 119 658.2 filed Jul. 19, 2019. The entire disclosure of the application referenced above is incorporated by reference.

FIELD

The present disclosure relates to a transmission for robot actuation and more particularly to a cycloidal transmission and a method for controlling a robot having a cycloidal transmission.

BACKGROUND

The increasing automation of machine tools and the growing use of robots in industry requires more sophisticated safety concepts. For example, the motion of robots or machines must be coordinated in an appropriate manner in order to contact or grasp objects, while at the same time people are protected from dangerous movements. Furthermore, optimized control of the contact force may also prevent wear or even damage to the machines themselves.

The coordination of the movements and the control of the forces exerted is usually controlled by a programmable controller, both in robots and machine tools. In order to perform these tasks, forces exerted are either measured by force transducers or estimated via a motor current.

In both cases, the results of the measurements or estimates are often imprecise. The measurement results can often be influenced by external forces or frictional effects in the machines themselves.

DE 10 2015 214 170 A1 discloses a robot comprising a robot controller configured and arranged to execute a robot program and comprising a robot arm with at least three joints connected by links, and comprising a number of drives corresponding to the at least three joints, of which each drive is designed for adjusting an associated joint of the at least three joints and is automated according to the robot program or can be driven in a manual driving mode by the robot controller in order to automatically adjust the associated joint. At least one of the links has a force measuring device which is designed to measure a force on the link in a predetermined direction.

SUMMARY

It is an object to specify a cycloidal transmission with a torque detection means that can detect torque exerted by the transmission more precisely. Furthermore, it is an object to specify a cycloidal transmission with a torque detection means that can enable improved machine control.

According to a first aspect of the present disclosure, there is provided a cycloidal transmission for a drive comprising:
 a housing with a first bearing, a second bearing and a rolling ring,
 a drive shaft rotatable mounted about its longitudinal axis in the first bearing,
 an eccentric fixedly connected to the drive shaft,
 a cam plate driven by the eccentric and having a plurality of holes,
 wherein the cam plate is configured to roll in the rolling ring,
 a pin plate having a plurality of pins, wherein the pins are configured to engage in the holes of the cam plate, so that the pin plate is driven by the cam plate,
 an output shaft fixedly connected to the pin plate, the output shaft being mounted in the second bearing so as to be rotatable mounted about its longitudinal axis, and
 a torque detection means,
 wherein the torque detection means is disposed between the first bearing and the second bearing and is configured to detect the torque of the output shaft.

It is thus an idea to measure the torque of the output shaft not from the outside but still within the cycloidal transmission, especially between the bearings of the drive shaft and the output shaft.

Cycloidal transmissions are generally known from the prior art. Cycloidal transmission are eccentric transmissions. In this case, cam plates transmit a torque by rolling. At first, the drive shaft with the eccentric (resp. the eccentric shaft) will drive the cam plate. The eccentric is usually an eccentric plate at the end of the drive shaft to the cam plate, wherein the eccentric plate is configured to engage centrally in the cam plate. Often there is also a rolling bearing between the eccentric and the cam plate. Such a drive results in an eccentric movement of the cam plate and a rotation around its own axis of symmetry.

The designation cam plate comes from the fact that the cam plate has a curved cam surface at its edge. The curved cam surface has the effect that when the plate rotates, its contour describes a cycloid. In this respect, the terms cycloid disc, cam disc and radial cam are also quite common. Furthermore, the cam plate or cycloid disk is also known as a rolling disk. This is because the cam plate, due to its curved cam surface, is designed to roll in the rolling ring or to roll on the rolling ring. In various embodiments the rolling ring (or pin ring) comprises several annularly arranged (stationary) pins or rollers on which the cam plate rolls.

Furthermore, the cam plate comprises several holes, which are usually arranged in a ring shape, i.e. as a ring of holes. Due to the eccentric drive via the drive shaft, the holes of the cam plate move against the direction of rotation of the drive shaft or eccentric. Behind the cam plate there is a pin plate with several pins, wherein the pins of the pin plate engage in the holes of the cam plate. In this way, the cam plate drives the pin plate in such a way that the pins of the subsequent pin plate also move against the direction of rotation of the drive shaft. The pins of the pin plate may also be arranged as a pin ring. Instead of fixed pins, rollers may be used, so that the pin plate may also be called roller plate.

The output shaft is firmly connected to the pin plate. While the drive shaft is supported (fix) in the first bearing, the output shaft is supported (fix) in the second bearing. In various embodiments, the output shaft is mounted coaxially to the drive shaft.

Generally, the rolling ring comprises one pin more than the cam plate has indentations. This allows the output drive or roller plate and the output shaft to rotate further by one indentation (of the cam disk) per input revolution, thus reducing its speed. Other ratios of holes to pins are conceivable. Furthermore, it is conceivable that the cycloidal transmission has not only one eccentric and one cam plate, but also several eccentrics and several cam plates. Thereby, unbalance effects can be avoided.

The torque detection means (device) can be located between the first bearing and the second bearing to measure the torque of the output shaft. The torque can be measured continuously, but may also be measured in discrete time steps. The positioning of the torque detection means between the first bearing and the second bearing, i.e. inside the transmission, may ensure that sources of error from outside the transmission cannot falsify the measurement of the output shaft torque. In fact, the torque detection means between the first bearing and the second bearing of the transmission is in a protected position. Furthermore, the torque is measured at the transmission side of the output shaft, so that tolerances in torque measurement due to the length of the output shaft are reduced. In other words, by integrating the torque detection means within the transmission, its bearings are used to decouple forces and torques that are not to be measured. Furthermore, installation space and additional costs for a separate torque measurement outside the transmission can be saved.

In a refinement of the cycloidal transmission, the first bearing, the second bearing and the rolling ring are fixedly arranged in the housing. This allows a fixed bearing of the drive shaft and the output shaft as well as a fixed position of the other transmission parts such as the cam plate, the pin plate and the torque detection means. Thereby, a high measuring accuracy of the torque can be ensured.

In a further refinement, the torque detection means are located between the pin plate and the second bearing. Thus, the torque detection means is located on the output side. A falsification of the measurement results due to frictional forces within the transmission can thus be excluded or at least be reduced.

In a further refinement, the torque detection means is integrated into the pin plate. Since the pin plate is firmly connected to the output shaft, this means that the torque detection means is also firmly positioned relative to the output shaft. This ensures a precise measurement of the torque of the output shaft. Furthermore, in this refinement the chain of tolerance of the transmission remains the same.

In a further refinement, the torque detection means is configured to detect the torque of the output shaft in the direction of rotation relative to the longitudinal axis of the output shaft.

In a further refinement, the torque detection means suppresses (or, masks) torques in other directions of rotation. This is achieved in various embodiments by the fact that the torque detection means is mounted fixedly.

In a further refinement, the torque detection means of the cycloidal transmission is firmly connected to the pin plate and/or the output shaft. This does not necessarily mean that the torque detection means must be directly connected to the output shaft or the pin plate. Actually, between the output shaft and the torque detection means (resp. pin plate and torque detection means) further, firmly connected components are conceivable. This means that not only the output shaft itself, but also the torque detection means is mounted fixedly. This enables a precise torque measurement.

In a further refinement, the torque detection means comprises one or more strain gauges. The torque detection means may comprise only one or alternatively several strain gauges applied to the output shaft and/or the pin plate or comprise a further component on which the strain gauge(s) is/are arranged. Due to the effect of a torque acting on the torque detection device, the device undergoes deformations, resulting in strains and compressions on its surface, which can be detected by the strain gauges, also called strain gages. The strain gauges can be glued to the torque detection means, the output shaft, or the pin plate, so that they can be deformed together with the object on which they are glued to. When using several strain gauges, they can be connected as a bridge circuit. In various embodiments the strain gauges are connected as a Wheatstone bridge circuit. For example, temperature compensation can be achieved by appropriately interconnecting and arranging the strain gauges. Thereby, expansions due to a change in temperature can cancel each other out. Furthermore, certain strain components can also be compensated or selected.

In a further refinement, the torque detection means includes a measuring flange. The measuring flange can be connected directly to the output shaft and/or the pin plate.

In a further refinement, the measuring flange comprises two concentric rings, wherein the inner ring is connected to the output shaft and the outer ring is connected to the pin plate, or wherein the inner ring is connected to the pin plate and the outer ring is connected to the output shaft. In principle, other rings are also conceivable.

In further refinement, the inner ring and the outer ring are connected by spokes, with strain gauges mounted on the spokes. For example, two strain gauges can be placed at each two opposite sides of the spokes. It is also conceivable that each spoke carries at least one strain gauge. Furthermore, not all spokes have to carry a strain gauge. For example, only half of the spokes may carry a strain gauge.

In a further refinement of the cycloidal transmission, the torque detection means is configured to transmit the detected torque to a control unit of the drive. This enables the drive or motor of a machine tool or robot to control the cycloid transmission according to the measured torque. For example, the control unit of the drive can be located in the joint unit of a robot, just like the drive itself. Other positions are also conceivable.

In further refinement, the cycloidal transmission comprises a transmitter, wherein the transmission of the detected torque to the control unit is performed via the transmitter. The transmitter can also serves as power supply for the torque detection means. However, the power supply of the torque detection means may also be provided by a battery, which, for example, is mounted on the output shaft and which rotates with it.

In a further refinement, the transmitter is at least one of a slip ring transmitter, an inductive transmitter, a capacitive transmitter, a radio transmitter and an optical transmitter.

Slip ring transmitters comprise a slip ring and a stator. The slip ring can be mounted on the output shaft (fix) and to rotate with the output shaft. The stator usually comprises carbon brushes that are configure to be in (constant) contact with the rotating slip rings. While the slip ring is connected to the torque detection means, for example with a strain gauge, the stator is connected to a control or evaluation unit. This allows the measured torque values of the output shaft to be transmitted to the control unit for evaluation. At the same time, it is conceivable that a supply voltage for the torque detection means is transmitted via the slip ring transmitter.

In contrast to data transmission by touch using slip rings, contactless transmission of the measured torque values is also conceivable, using inductive transmitters, capacitive transmitters, radio transmitters or optical transmitters. With inductive and capacitive transmitters, it is also possible that they can act as power supply for the torque detection means.

A radio transmitter, for example, comprises a transmitter and a receiver. The transmitter may be integrated into the torque detection means, but may also be otherwise connected to it so that the measurement data of the torque detection means are available to the transmitter. The measurement data is transmitted via the transmitter as an electromagnetic signal to the receiver. The receiver then makes the received signal available to the control unit of the drive.

In a further refinement, at least one of the draft shaft, the output shaft and the torque detection means of the cycloidal transmission is configured as a hollow shaft. This enables data or current lines to be arranged within the respective shafts and/or the torque detection means. Furthermore, in the case of the torque detection means be designed as a hollow shaft, strain gauges can be applied directly to the surface of the hollow shaft without loss of measuring accuracy.

According to a second aspect of the present disclosure, there is provided a robot comprising:
- a drive-side robot link and an output-side robot link,
- a joint unit which joints the drive-side robot link and the output-side robot link, and
- a cycloidal transmission according to at least one embodiment described herein,
- wherein the cycloidal transmission is arranged in the joint unit and is configured to drive the output-side robot link via the output shaft.

In a refinement of the robot, the robot may comprise a control unit, wherein the torque detection means of the cycloidal transmission is configured to transmit the detected torque to the control unit and wherein the control unit is configured to control the robot based on the detected torque.

The control unit can be configured to control the robot safely. This means that the robot is equipped with fail-safe components for machine and plant safety, which typically meet the "safety requirement level" SIL 3 according to EN/IEC 61508 and/or the "performance level" PL e according to EN/ISO 13849. Furthermore, the control unit can be a safety control. A safety controller differs from a "normal" standard controller in that it is configured to be intrinsically fail-safe through means such as redundant signal processing channels, regular self-tests and the like.

During operation of the robot, a torque may act on the output-side robot link. This torque is measured via the torque detection means. If a torque acts on the output-side robot link, it also acts on the cycloidal transmission, since the output shaft is firmly connected to the output-side robot link and is mounted fixedly within the transmission.

According to a third aspect of the present disclosure, there is provided a method for controlling a robot having a cycloidal transmission according to at least one embodiment described herein, the method comprising:
- measuring a torque with the torque detection means of the cycloidal transmission,
- transmitting the detected torque to a control unit of the robot, and controlling the robot based on the detected torque.

The method can be a safe method, i.e. a method where the "safety requirement level" SIL 3 according to EN/IEC 61508 and/or the "performance level" PL e according to EN/ISO 13849 is fulfilled.

It goes without saying that the features mentioned above and those to be explained below can be used not only in the combination indicated in each case, but also in other combinations or on their own, without leaving the scope of the present disclosure.

BRIEF DESCRIPTION OF THE DRAWINGS

Embodiments of the invention are shown in the drawings and are explained in more detail in the following description.

DETAILED DESCRIPTION

Figure 1:
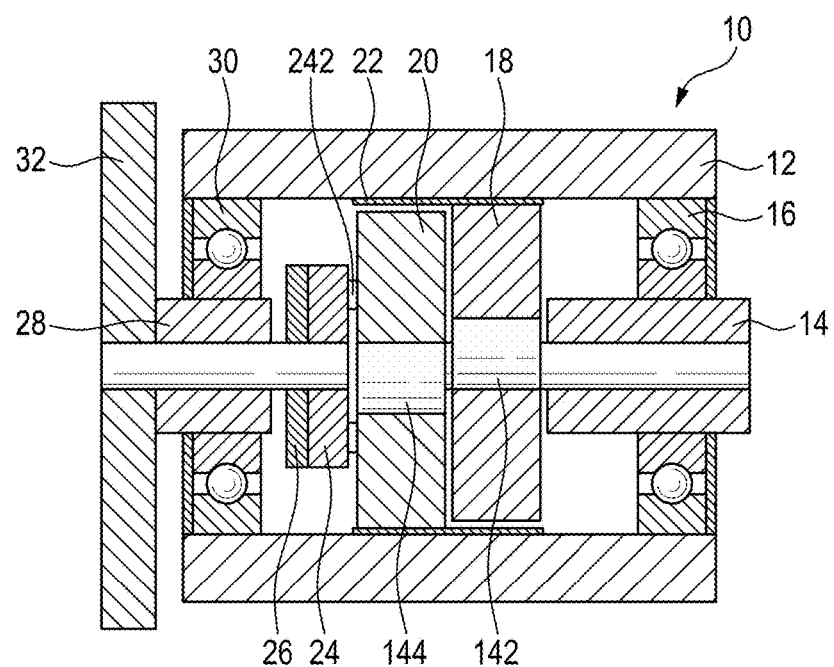
FIG. 1 is a cross-sectional view of a first example embodiment of a cycloidal transmission for drive.

FIG. 1 shows a first example embodiment of the cycloidal transmission for a drive in a cross-sectional view. The cycloidal transmission is denoted here in its entirety by reference numeral 10. The cycloidal transmission 10 includes a housing 12, a drive shaft 14 with a first eccentric 142 and a second eccentric 144, a first bearing 16 for the drive shaft 14, a first cam plate 18, a second cam plate 20, a rolling ring 22, a pin plate 24, a torque detection means 26, an output shaft 28, a second bearing 30 for the output shaft 28 and an outer flange 32.

In this example embodiment, the housing encloses all parts of the transmission 10 and only the drive shaft 14 and the output shaft 28 with the outer flange 32 protrude from the housing 12. For example, the housing 12 can be made of metal or plastic and has the primary task of protecting the internal transmission parts from external influences such as dust. The first bearing 16 at the input side (drive side) is used to support the drive shaft 14, while the second bearing 30 at the output side is configured to support the output shaft 28. The two bearings 16 and 30 can be firmly connected to the housing 12. The bearings 16 and 30 can be configured as rolling bearings, for example. In this example embodiment, the drive shaft 14 includes two eccentrics, the first eccentric 142 being configured to drive the first cam plate 18 and the second eccentric 144 being configured to drive the second cam plate 20. In fact, the cam plates 18 and 20 are each rotatably mounted on one of the eccentrics. Accordingly, the cam plates 18 and 20 are driven eccentrically. In this example embodiment, the cam plates are arranged offset by 180° to ensure the most symmetrical load distribution possible and to minimize or prevent imbalances.

The cam plates 18 and 20 each have several recesses at the edge of the plate, over which they can roll on the rolling ring 22 or its pin. The rolling ring 22 can be mounted firmly in the housing 12, but does not necessarily have to be directly connected to it. The rolling ring 22 can be formed from a ring with fixed pins or rollers 222. However, the rolling ring 22 may also be formed by arranging pins 222 directly on the housing wall.

In this example embodiment, the pin plate 24 is located behind the second cam plate 20. The pin plate 24 includes several pins 242. The number of pins 242 can be the same as the number of holes in the cam plates 18 and 20. The pins 242 are configured to engage in the holes of the first cam plate 18 and the second cam plate 20 and roll in their holes as a result of the rotational movement of the cam plates, so that the pin plate 24 is driven by the cam plates 18, 20.

In this example embodiment, the torque detection means 26 is arranged behind the pin plate 24. The torque detection means 26 is here a measuring flange, which is flanged on the back of the pin plate 24 and connected to the output shaft 28. The torque detection means can be arranged before the second bearing 30. The torque detection means 26 is configured to measure the torque of the output shaft 28.

Outside the housing 12, the outer flange 32 is attached to the output shaft 28. Components such as a robot arm may be flanged to the outer flange.

Figure 2:
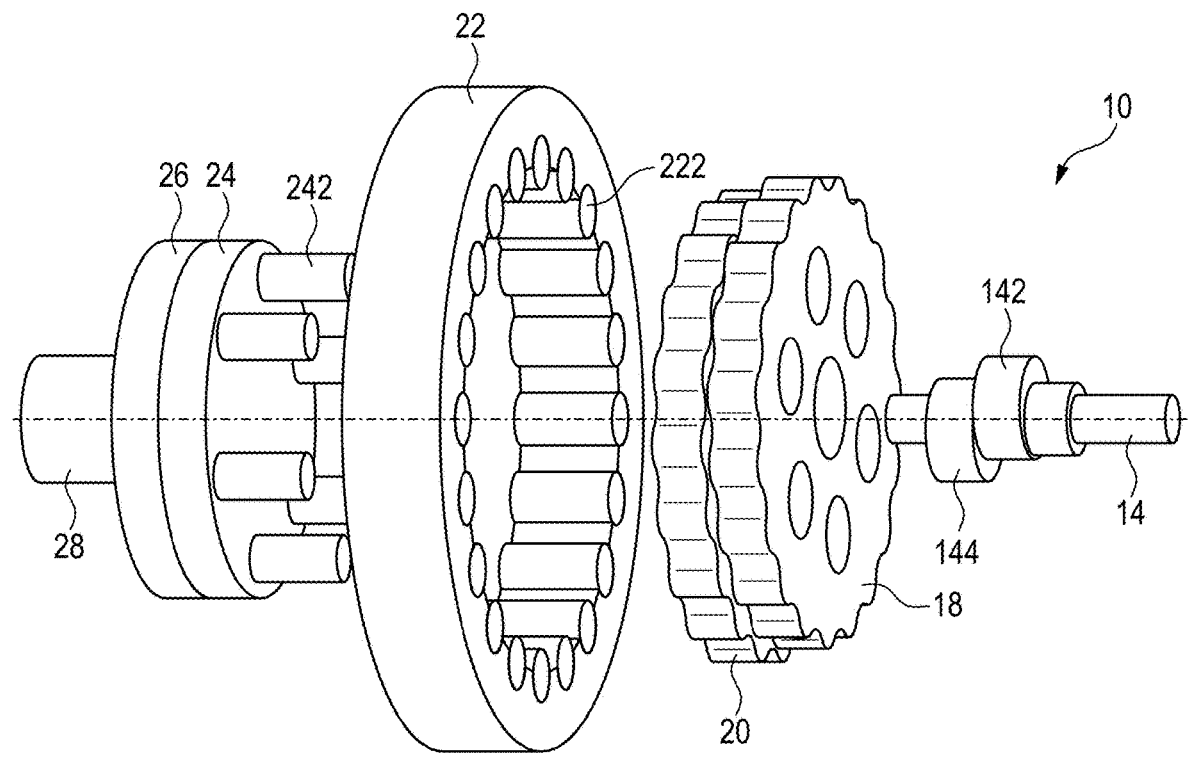
FIG. 2 is an exploded view of the first example embodiment of the cycloidal transmission for a drive.

FIG. 2 shows the first example embodiment of the cycloidal transmission 10 for a drive in an exploded view. Not shown in this illustration are the housing 12 as well as the first bearing 16, the second bearing 30 and the outer flange 32. In this illustration, the first eccentric 142, the second eccentric 144, the rollers 222 of the rolling bearings and the pins 242 of the pin plate 24 can be recognize easily. Further, it can be seen, that the drive shaft 14 (also called input shaft) has two eccentrics 142 and 144, which are shaped like circle disks and which are mounted eccentrically to the longitudinal axis of the drive shaft 14. In various embodiments the eccentrics are rotated by 180°. Thereby, imbalances can be prevented effectively.

Figure 3:
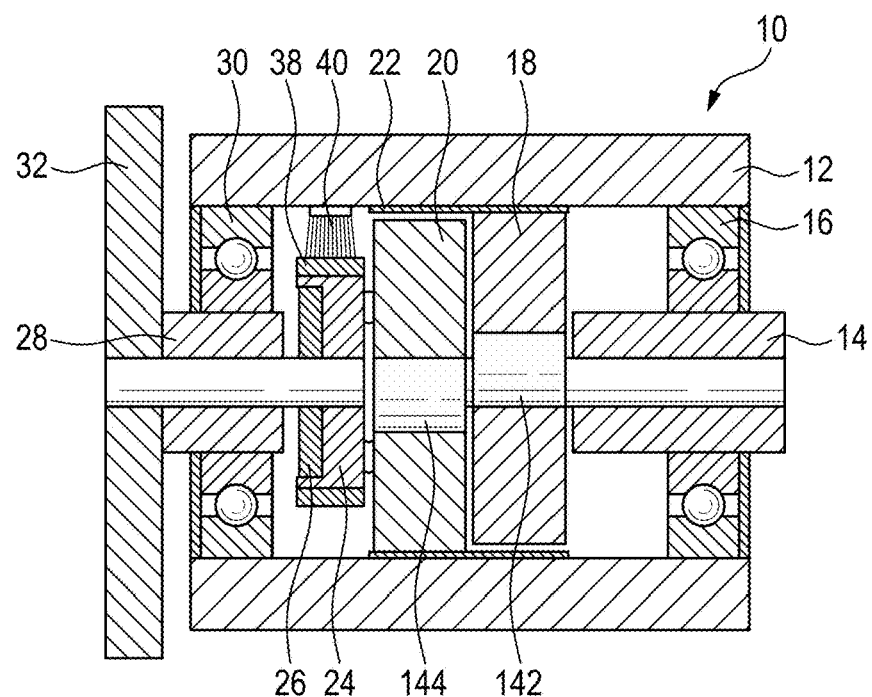
FIG. 3 is a cross-sectional view of a second example embodiment of the cycloidal transmission.

FIG. 3 shows a second example embodiment of the cycloidal transmission 10 in a cross-sectional view. Like the cycloidal transmission of the first example embodiment, the cycloidal transmission of the second example embodiment also includes two cam plates (i.e. cycloidal disks). In this example embodiment, the torque detection means 26 is integrated into the pin plate 24. In other words, the torque detection means 26 is installed as a single unit in the pin plate 24, i.e. in the converter.

Furthermore, the cycloidal transmission 10 in this example embodiment includes a slip ring transmitter, which includes a slip ring 38 and a stator 40. The slip ring 38 is fixed on the pin plate 24 and is connectable to the torque detection means 26. The stator 40 includes a brush, which is in contact with the slip ring 38. While the slip ring 38 rotates with the pin plate 24 or the output shaft 28, the stator 40 is fixed and immovable relative to the housing 12. The slip ring transmitter enables the torque measured by the strain gauge 34 to be transmitted to a control unit of the drive of the transmission 10.

Figure 4:
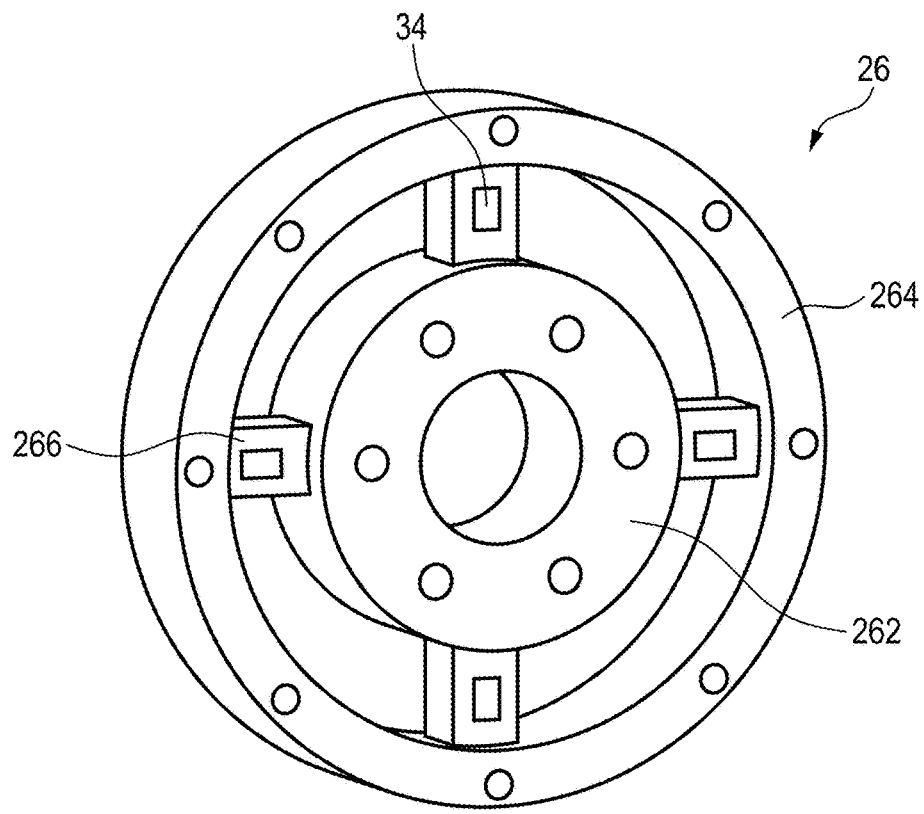
FIG. 4 is a perspective view of an example embodiment of a torque detection means for a cycloidal transmission.

FIG. 4 shows an example embodiment of a torque detection means for a cycloidal transmission in a perspective view. In this example embodiment, the torque detection means 26 or the torque sensor is formed as a measuring flange. The torque detection means 26 includes two concentric rings 262 and 264, which are connected by struts and spokes 266 respectively. Both rings include several holes for mounting to the output-side components of a cycloidal transmission 10, e.g. the inner ring 262 can be mounted to the output shaft 28 and the outer ring 264 can be mounted to the pin plate 24. Other mounting options are also conceivable. In this example embodiment, a strain gauge 34 is provided on each of the spokes 266 spaced at 90° to each other to measure the torque of the torque detection means 26 (and thus the output shaft). In principle, it is also conceivable that not all spokes carry strain gauges. In fact, a strain gauge may also be located at a different point on the flange. The strain gauges can be glued to the flange. During operation, the measuring spokes 266 deform elastically and to varying degrees depending on the load applied. The strain gauges 34 arranged on the measuring spokes 266 deform in the same way as the measuring spokes 266, and the strain gauges 34 indicate this deformation as a change in their electrical characteristic (e.g. their electrical resistance). This change in turn can be associated with a torque, so that the strain gauge 34 act as torque sensors.

Figure 5:
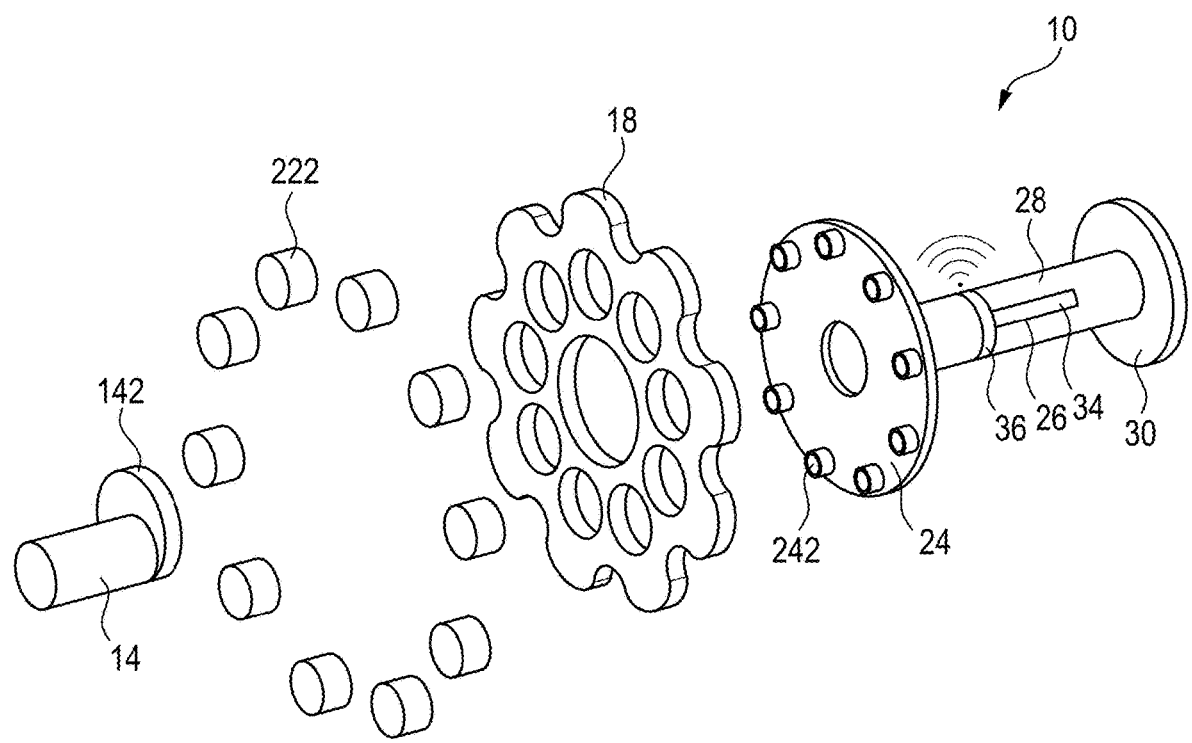
FIG. 5 is an exploded view of a third example embodiment of the cycloidal transmission.

FIG. 5 shows a third example embodiment of a cycloidal transmission in an exploded view. In this example embodiment, the output shaft 28 is configured as a hollow shaft. The torque detection means 26 includes in this embodiment a strain gauge 34, which is mounted between the pin plate 24 and the second bearing 30 (directly) on the output shaft 28. The output shaft is rotatable mounted in the second bearing 30 and is deformed by the rotation in this bearing. As a result, the attached strain gauge 34 is also deformed, enabling the torque detection means 26 to determine the torque acting on the output shaft 28. In other embodiments, the use of several strain gauges 34 is conceivable, which can be arranged as a strain measurement rosette.

Also shown here is a transmitter 36, which in this example embodiment is located on the output shaft 28 and is in contact with the strain gauge 34. The transmitter 36 is configured to transmit the torque of the output shaft 28 detected by the strain gauge 34 to a control unit for evaluation. In this example embodiment, the transmission is wireless, especially via radio.

Figure 6:
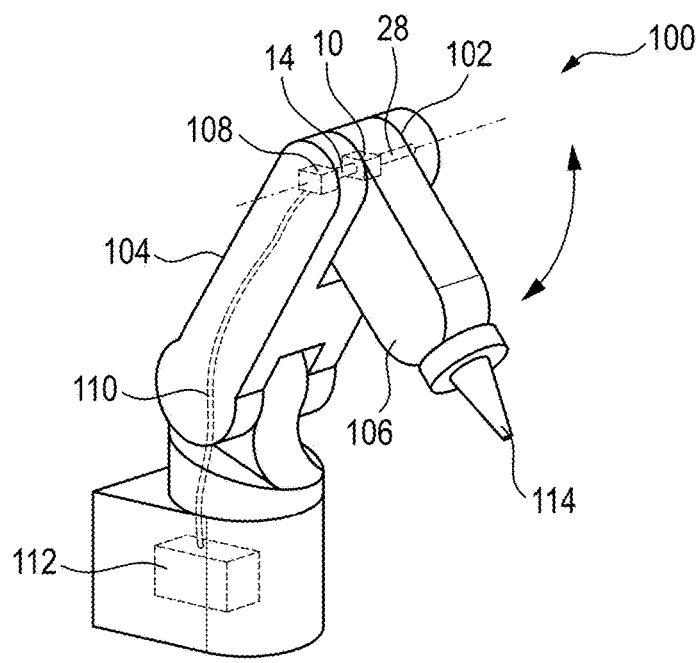
FIG. 6 is a perspective view of an example embodiment of a robot comprising a cycloidal transmission according to at least one embodiment described herein.

FIG. 6 shows in a perspective view an example embodiment of a robot including a cycloid transmission according to at least one embodiment described here. The robot 100 shown here includes a joint unit 102, which connects a drive-side robot link 104 with an output-side robot link 106 (also referred to as a robot arm). In this example embodiment, at least the output-side robot link 106 is movably connected to the joint unit 102 or the joint. Inside the joint unit 102 is a cycloidal transmission 10 from which the drive shaft 14 and the output shaft 28 protrude. In addition, the joint unit 102 includes a drive 108, which is configured to drive the drive shaft 14. The drive 108 can be supplied with power via a power cable 110, for example. The drive shaft 14 is coupled to the output shaft 28 via the transmission 10. The output shaft 28 in turn is firmly connected to the output-side robot link 106. Thus, the drive 108 in the joint unit 102 drives the output-side robot link 106 via the cycloidal transmission 10. Since the output shaft 28 is driven rotatably about its longitudinal axis, the output-side robot link 106 is also movable rotatably about this longitudinal axis. The rotary motion of the output-side robot link 106 allows a tool 114 located on the robot arm to be moved precisely towards a workpiece.

The cycloidal transmission 10 installed in the joint unit 102 includes a torque detection means 26 (not shown), which is configured to measure the torque of the output shaft 28 or of the output-side robot link 106 which is firmly connected to the output shaft 28. After the measurement of the applied torque has been completed, the measured values are provided by the torque detection means 26 of the cycloidal transmission 10 to the control unit 112 of the robot 100. Depending on the measured values, the control unit 112 can control the output-side robot link 106 of the robot 100.

In order to avoid damage to the workpiece, the robot 100 itself, or people in the vicinity of the robot 100, the torque of the output-side robot link 106 can be monitored permanently via the torque detection means 26. In various embodiments the torques measured by the torque detection means 26 are transmitted to the control unit 112. If, for example, predetermined thresholds are exceeded, the control unit 112 initiates an adjustment of the torque of the drive shaft 14 via the drive 108 or stops the drive 108.

It is conceivable, for example, that the torque of the output-side robot link 106 or the output shaft 28, due to unforeseen resistance such as contact with a human, may not correspond to the torque that should actually be generated by the drive 108. Furthermore, friction effects within the cycloidal transmission 10 can also lead to unforeseen changes in the torque of the output shaft 28. Due to the fixed bearing of the torque detection means 26 within the cycloidal transmission 10, changes in torque can be measured extremely precisely. Furthermore, a subsequent transmission of the measured values to the control unit 112 allows the torque of the drive shaft 14 to be changed quickly by the control unit 112 or the drive 108. The transmission can be in real time. In this example embodiment, the information transmission between the torque detection means 26, the control unit 112 and the drive 108 is carried out by cable (not shown), but in principle it can also be carried out wirelessly.

The phrase at least one of A, B, and C should be construed to mean a logical (A OR B OR C), using a non-exclusive logical OR, and should not be construed to mean "at least one of A, at least one of B, and at least one of C."

What is claimed is:

1. A cycloidal transmission for a drive, the cycloidal transmission comprising:
    a housing including a first bearing, a second bearing, and a rolling ring;
    a drive shaft rotatably mounted about its longitudinal axis in the first bearing;
    an eccentric fixedly connected to the drive shaft;
    a cam plate driven by the eccentric and including a plurality of holes, wherein the cam plate is configured to roll in the rolling ring;
    a pin plate including a plurality of pins, wherein the pins are configured to engage the holes of the cam plate, so that the pin plate is driven by the cam plate;
    an output shaft fixedly connected to the pin plate, wherein the output shaft is mounted in the second bearing so as to be rotatably mounted about its longitudinal axis; and
    a torque detection mechanism configured to detect the torque of the output shaft,
    wherein the torque detection mechanism is disposed between the first bearing and the second bearing, and
    wherein the torque detection mechanism is at least one of:
        integrated into the pin plate,
        fixedly connected to the pin plate, and fixedly connected to the output shaft.

2. The cycloidal transmission of claim 1, wherein the first bearing, the second bearing, and the rolling ring are fixedly arranged in the housing.

3. The cycloidal transmission of claim 1, wherein the torque detection mechanism is located between the pin plate and the second bearing.

4. The cycloidal transmission of claim 1, wherein the torque detection mechanism is configured to detect the torque of the output shaft in a direction of rotation relative to the longitudinal axis of the output shaft.

5. The cycloidal transmission of claim 1, wherein the torque detection mechanism comprises one or more strain gauges.

6. The cycloidal transmission of claim 1, wherein the torque detection mechanism is configured to transmit the detected torque to a control unit of the drive.

7. The cycloidal transmission of claim 6, further comprising:
    a transmitter,
    wherein the transmission of the detected torque to the control unit is performed via the transmitter.

8. The cycloidal transmission of claim 7, wherein the transmitter is at least one of a slip ring transmitter, an inductive transmitter, a capacitive transmitter, a radio transmitter, and an optical transmitter.

9. The cycloidal transmission of claim 1, wherein at least one of the drive shaft, the output shaft, and the torque detection mechanism is configured as a hollow shaft.

10. A robot comprising:
    the cycloidal transmission of claim 1;
    a drive-side robot link and an output-side robot link; and
    a joint unit which joints the drive-side robot link and the output-side robot link,
    wherein the cycloidal transmission is arranged in the joint unit and is configured to drive the output-side robot link via the output shaft.

11. The robot of claim 10, further comprising:
    a control unit,
    wherein the torque detection mechanism of the cycloidal transmission is configured to transmit the detected torque to the control unit, and
    wherein the control unit is configured to control the robot based on the detected torque.

12. A cycloidal transmission for a drive, the cycloidal transmission comprising:
    a housing including a first bearing, a second bearing, and a rolling ring;
    a drive shaft rotatably mounted about its longitudinal axis in the first bearing;
    an eccentric fixedly connected to the drive shaft;
    a cam plate driven by the eccentric and including a plurality of holes, wherein the cam plate is configured to roll in the rolling ring;
    a pin plate including a plurality of pins, wherein the pins are configured to engage the holes of the cam plate, so that the pin plate is driven by the cam plate;
    an output shaft fixedly connected to the pin plate, wherein the output shaft is mounted in the second bearing so as to be rotatably mounted about its longitudinal axis; and
    a torque detection mechanism configured to detect the torque of the output shaft,
    wherein the torque detection mechanism is disposed between the first bearing and the second bearing,
    wherein the torque detection mechanism comprises a measuring flange,
    wherein the measuring flange comprises inner and outer concentric rings,
    wherein the inner ring is connected to at least one of the output shaft and the pin plate, and
    wherein the outer ring is connected to at least one of the output shaft and the pin plate.

13. The cycloidal transmission of claim 12, wherein:
    the inner ring and the outer ring are connected by spokes, and
    strain gauges are mounted on the spokes.

14. A robot comprising:
    the cycloidal transmission of claim 12;
    a drive-side robot link and an output-side robot link; and
    a joint unit which joints the drive-side robot link and the output-side robot link,
    wherein the cycloidal transmission is arranged in the joint unit and is configured to drive the output-side robot link via the output shaft.

* * * * *

UNITED STATES PATENT AND TRADEMARK OFFICE
CERTIFICATE OF CORRECTION

PATENT NO. : 11,607,800 B2
APPLICATION NO. : 16/932810
DATED : March 21, 2023
INVENTOR(S) : Peng Zhang et al.

It is certified that error appears in the above-identified patent and that said Letters Patent is hereby corrected as shown below:

In the Claims

Claim 1, Column 9, Line 37          after "and", insert --¶--

Signed and Sealed this
First Day of October, 2024

Katherine Kelly Vidal
*Director of the United States Patent and Trademark Office*